United States Patent
Oh et al.

(10) Patent No.: US 9,697,725 B2
(45) Date of Patent: Jul. 4, 2017

(54) APPARATUS AND METHOD FOR PROVIDING BATTERY INFORMATION, AND USER TERMINAL THEREFOR

(71) Applicant: Samsung Electronics Co., Ltd., Gyeonggi-do (KR)

(72) Inventors: Seung-Taeg Oh, Gyeongsangbuk-do (KR); Soon-Sang Park, Daegu (KR)

(73) Assignee: Samsung Electronics Co., Ltd (KR)

( * ) Notice: Subject to any disclaimer, the term of this patent is extended or adjusted under 35 U.S.C. 154(b) by 127 days.

(21) Appl. No.: 14/273,083

(22) Filed: May 8, 2014

(65) Prior Publication Data

US 2014/0347057 A1    Nov. 27, 2014

(30) Foreign Application Priority Data

May 24, 2013    (KR) .................. 10-2013-0058971

(51) Int. Cl.
*G01N 27/416*    (2006.01)
*H02J 7/00*    (2006.01)
*G08C 17/02*    (2006.01)
*H04Q 9/00*    (2006.01)
*H01M 10/42*    (2006.01)

(52) U.S. Cl.
CPC .............. *G08C 17/02* (2013.01); *H04Q 9/00* (2013.01); *H01M 2010/4278* (2013.01)

(58) Field of Classification Search
CPC ......................... G01R 31/3606; G08C 17/02
USPC ................................. 324/426; 320/108, 106
See application file for complete search history.

(56) References Cited

U.S. PATENT DOCUMENTS

| | | | | |
|---|---|---|---|---|
| 5,443,924 A * | 8/1995 | Spellman | ............. | H01M 2/023 429/167 |
| 6,005,367 A * | 12/1999 | Rohde | ................... | H02J 7/0004 320/106 |
| 7,059,769 B1 * | 6/2006 | Potega | ................ | B60L 11/1861 338/22 R |
| 7,109,875 B2 * | 9/2006 | Ota | ...................... | G08B 25/009 320/132 |
| 7,449,863 B2 * | 11/2008 | Tashiro | ................ | H02J 7/0004 320/112 |
| 8,074,888 B2 * | 12/2011 | Naccache | ............. | G07F 7/0833 235/472.02 |
| 8,295,994 B2 * | 10/2012 | Hwang | ................ | G07C 5/0816 455/426.1 |
| 8,532,007 B2 * | 9/2013 | Araki | ...................... | H04L 12/66 370/252 |
| 8,538,459 B2 * | 9/2013 | Choi | ................. | H04M 1/72566 455/412.1 |
| 9,294,596 B2 * | 3/2016 | Kim | ..................... | H04M 1/0266 |
| 2005/0048359 A1 * | 3/2005 | Yamada | ................ | H01M 10/48 429/90 |
| 2005/0088144 A1 * | 4/2005 | Pacholok | ............... | H02J 7/022 320/131 |
| 2005/0209998 A1 * | 9/2005 | Takata | ................... | G06F 21/10 |

(Continued)

*Primary Examiner* — M'Baye Diao
(74) *Attorney, Agent, or Firm* — The Farrell Law Firm, P.C.

(57) ABSTRACT

A battery information providing apparatus includes a short-range communication module for performing short-range communication; an information detector for detecting battery information; and a microprocessor for controlling the battery information to be transmitted by the short-range communication module.

20 Claims, 6 Drawing Sheets

(56) References Cited

U.S. PATENT DOCUMENTS

| | | | |
|---|---|---|---|
| 2007/0123304 A1* | 5/2007 | Pattenden | G06F 1/26 455/557 |
| 2008/0082918 A1* | 4/2008 | Hwang | G06F 1/30 715/700 |
| 2009/0085523 A1* | 4/2009 | Kim | H01M 10/44 320/138 |
| 2009/0140692 A1* | 6/2009 | Hwang | G08C 17/04 320/108 |
| 2010/0073003 A1* | 3/2010 | Sakurai | H02J 5/005 324/426 |
| 2010/0093407 A1* | 4/2010 | Kawata | H01M 10/48 455/572 |
| 2011/0074339 A1* | 3/2011 | Midorikawa | G06F 1/1635 320/106 |
| 2011/0275421 A1 | 11/2011 | Wong et al. | |
| 2012/0040608 A1 | 2/2012 | Walker et al. | |
| 2012/0295672 A1* | 11/2012 | Kim | H04M 1/2745 455/573 |
| 2013/0024306 A1* | 1/2013 | Shah | G06Q 20/32 705/17 |
| 2014/0068314 A1* | 3/2014 | Kim | G06F 1/3212 713/340 |
| 2014/0070813 A1* | 3/2014 | Luo | G01R 31/3627 324/426 |
| 2014/0374475 A1* | 12/2014 | Kallfelz | H04Q 9/00 235/375 |
| 2015/0008931 A1* | 1/2015 | Sugeno | B60L 3/0046 324/434 |

\* cited by examiner

APPARATUS AND METHOD FOR PROVIDING BATTERY INFORMATION, AND USER TERMINAL THEREFOR

PRIORITY

This application claims priority under 35 U.S.C. §119(a) to a Korean patent application filed on May 24, 2013 in the Korean Intellectual Property Office and assigned Serial No. 10-2013-0058971, the entire disclosure of which is incorporated herein by reference.

BACKGROUND OF THE INVENTION

1. Field of the Invention

The present invention generally relates to an apparatus and method for providing battery information using a user terminal.

2. Description of the Related Art

With development of electronic technologies, there are a growing number of portable electronic devices, such as portable computers, portable phones, smartphones, etc., which are also referred to as user terminals. In use, remaining battery power or charge information based on charging or discharging status of the user terminal is very important for the user to use the user terminal.

For example, the battery power remaining information is checked to store present working data or to caution the user about a low battery charging level. For this reason, various user terminals today are trying various methods of providing the battery power remaining information to users.

In a conventional method for checking the remaining battery power, in order for the user to check the battery power remaining of a battery, the user first attaches the battery to the user terminal and checks the remaining battery power through the user terminal.

If the user wants to check the battery power remaining of another battery, he/she has to turn off the user terminal, remove the previous battery, attach the other battery, turn on the user terminal again, and then check the battery power remaining of the other battery, which is a time consuming and inconvenient process.

SUMMARY OF THE INVENTION

The present invention has been made to address at least the problems and disadvantages described above, and to provide at least the advantages described below.

An aspect of embodiments of the present invention is to provide an apparatus, method and user terminal for providing battery information to inform a user of remaining battery power information using a short-range communication technology, such as Near Field Communication (NFC) tagging technology without attaching the battery to the user terminal, so that the user may know the remaining battery power information conveniently.

Another aspect of embodiments of the present invention is to provide an apparatus, method and user terminal for providing battery information to inform a user of remaining battery power information by detecting remaining battery power not only from inside of a battery but also from outside of the battery, e.g., from an accessory for charging the battery.

In accordance with an aspect of the present invention, a battery information providing apparatus is provided, including a short-range communication module for performing short-range communication; an information detector for detecting battery information; and a microprocessor for controlling the battery information to be transmitted by the short-range communication module.

In accordance with another aspect of the present invention, a method for informing a user of battery information is provided, the method including receiving battery information through short-range communication; and displaying the battery information.

In accordance with another aspect of the present invention, a user terminal is provided, including a short-range communication unit for receiving battery information through short-range communication; and a display unit for displaying the battery information.

In accordance with another aspect of the present invention, a battery device is provided, including a battery cell; and a battery information providing apparatus configured to store battery information and transmit the battery information through a short-range communication module.

In accordance with another aspect of the present invention, a battery charging apparatus is provided, including a battery information providing apparatus, the battery information providing apparatus including a short-range communication module for performing short-range communication, an information detector for detecting battery information and a microprocessor for controlling the battery information to be transmitted by the short-range communication module.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above aspects, features and advantages of the present invention will become more apparent from the following detailed description of embodiments of the present invention, taken with reference to the attached drawings, in which.

Throughout the drawings, like reference numerals will be understood to refer to like parts, components, and structures.

DETAILED DESCRIPTION OF EMBODIMENTS OF THE PRESENT INVENTION

Figure 1:
FIG. 1 illustrates a battery information providing apparatus and a user terminal according to an embodiment of the present invention.

The following description with reference to the accompanying drawings is provided to assist a person of ordinary skill in the art with a comprehensive understanding of the present invention. The description includes various specific details to assist in that understanding but these are to be regarded as mere examples for illustrative purposes. Accordingly, those of ordinary skill in the art will recognize that various changes and modifications of the embodiments described herein can be made without departing from the invention. In addition, descriptions of well-known functions and constructions may be omitted for clarity and conciseness when their inclusion may obscure an artisan's appreciation of the subject matter of the present invention. Accordingly, it should be apparent to those skilled in the art that the following description of embodiments of the present invention is provided for illustration purposes only and not for the purpose of limiting the invention as defined by the appended claims and their equivalents.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the present invention. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a battery information providing apparatus and a user terminal according to an embodiment of the present invention. Referring to FIG. 1, a battery information providing apparatus 200 is equipped in a battery or may be located within a battery charger, and stores battery information. The battery information may include information about battery voltage to indicate remaining battery power. The battery information may further include battery identification information to identify various batteries, e.g., whether the battery in question is an internal battery or an external battery, a main battery or an auxiliary battery, a high capacity battery or a low capacity battery, etc. The battery information may further include information about the usage of the battery (battery usage information), e.g., which type of terminals the battery is compatible with. The battery information providing apparatus 200 may detect a voltage of the battery at a request of the user terminal 100 to provide battery information and store the battery voltage information of the detected voltage of the battery.

The battery information providing apparatus 200 may send the battery information including the battery voltage information to the user terminal 100 wirelessly, when the battery is not connected to the user terminal 100.

The user terminal 100 may be provided with an application to provide battery information. In order to obtain battery information, the user terminal 100 runs the application or receives the battery information from the battery information providing apparatus 200 through short-range communication at the request of the user. Upon reception of the battery information from the battery information providing apparatus 200, the user terminal 100 may output the battery information. For example, the user terminal 100 may provide the battery information to the user by displaying the battery information including the battery voltage information on a screen, or by outputting audio signal(s) for the battery information. Therefore, the user may be given information about a battery of interest through the user terminal 100 without manually attaching the battery to the user terminal 100.

Figure 2:
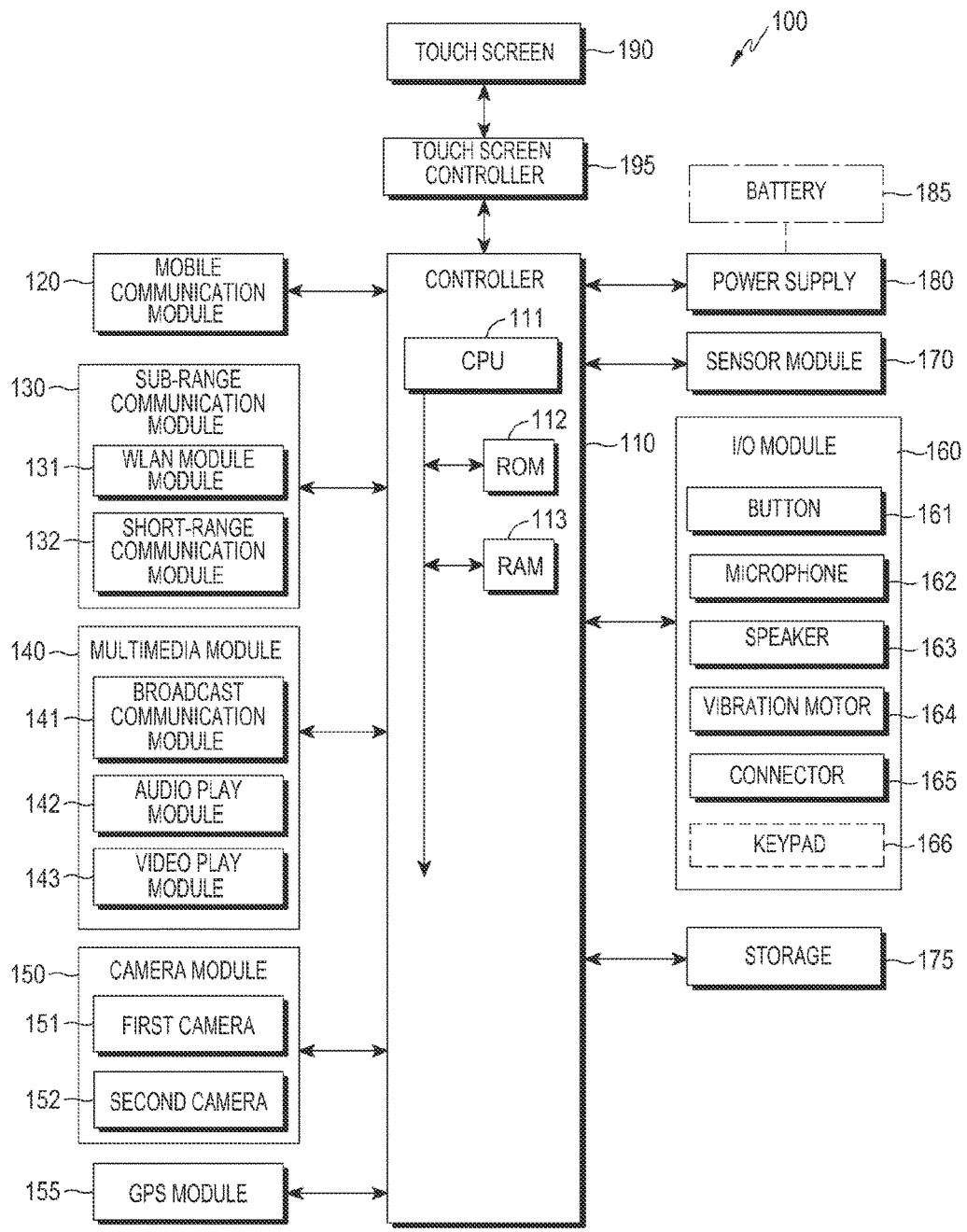
FIG. 2 is a block diagram of a user terminal, according to an embodiment of the present invention.

FIG. 2 is a schematic block diagram of a user terminal, according to an embodiment of the present invention. Referring to FIG. 2, a user terminal 100 may be connected to an external device (not shown) via a mobile communication module 120, a sub-range communication module 130, and a connector 165. The "external device" includes another user terminal, a cell phone, a smart phone, a tablet Personal Computer (PC), and a server, all of which are not shown.

Referring to FIG. 2, the user terminal 100 includes a touch screen 190 and a touch screen controller 195. The user terminal 100 also includes, among other components, a controller 110, the mobile communication module 120, the sub-range communication module 130, a multimedia module 140, a camera module 150, a Global Positioning System (GPS) module 155, an input/output module 160, a sensor module 170, a power supply 180, and a storage 185, all of which provide functions know to those skilled in the art. The sub-communication module 130 includes at least one of Wireless Local Area Network (WLAN) 131 and a short-range communication module 132, and the multimedia module 140 includes at least one of a broadcast communication module 141, an audio play module 142, and video play module 143. The camera module 150 includes at least one of a first camera 151 and a second camera 152; and the input/output module 160 includes at least one of buttons 161, a microphone 162, a speaker 163, a vibration motor 164, a connector 165, and a keypad 166, all of which are known in the art.

The controller 110 may include a Central Processing Unit (CPU) 111, a Read Only Memory (ROM) 112 for storing a control program to control the user terminal 100, and a Random Access Memory (RAM) 113 for storing signals or data input from an outside or for being used as a memory space for working results in the user terminal 100. The CPU 111 may include a single core, dual cores, triple cores, or quad cores. The CPU 111, ROM 112, and RAM 113 may be connected to each other via an internal bus.

The controller 110 controls the overall operations of the user terminal, and in particular, controls the mobile communication module 120, the sub-communication module 130, the multimedia module 140, the camera module 150, the GPS module 155, the input/output module 160, the sensor module 170, the power supply 180, the storage 185, the touch screen 190, and the touch screen controller 195.

The controller 110 controls battery information to be received from a battery information providing apparatus by short-range communication in accordance with an embodiment of the present invention. Upon reception of the battery information, the controller 110 controls the battery information to be output. For example, the controller may control information about remaining battery power to be displayed on e.g., the touch screen 190 or to be output through the speaker 163.

The mobile communication module 120 enables the user terminal 100 to be connected to an external device through mobile communication using at least one—one or more—antennas (not shown) under control of the controller 110. The mobile communication module 120 transmits/receives wireless signals for voice calls, video conference calls, Short Message Service (SMS) messages, or Multimedia Message Service (MMS) messages, and video data in accordance with embodiments of the present invention to/from a cell phone, a smart phone, a tablet PC, or another device, the phones having phone numbers entered into the user terminal 100.

The sub-communication module 130 may include at least one of the WLAN module 131 and the short-range communication module 132. For example, the sub-communication module 130 may include either the WLAN module 131 or the-short range communication module 132, or both.

The WLAN module 131 may be connected to the Internet in a place where there is an Access Point (AP), under control of the controller 110. The WLAN module 131 supports Institute of Electrical and Electronic Engineers' (IEEE's) WLAN standard IEEE802.11x. The short-range communication module 132 may conduct short-range communication between the mobile device 100 and an image rendering device (not shown) under control of the controller 110. The short-range communication may include Bluetooth, Infrared Data Association (IrDA), Wireless Fidelity (WiFi)-Direct, Near Field Communication (NFC), ZigBee, Radio Frequency Identification (RFID) communication, etc.

The user terminal 100 may include at least one of the mobile communication module 120, the WLAN module 131 and the short-range communication module 132 based on its capability. For example, the user terminal 100 may include a combination of the mobile communication module 120, the WLAN module 131 and the short-range communication module 132 based on performance.

The input/output module 160 may include at least one of a plurality of buttons 161, the microphone 162, the speaker 163, the vibration motor 164, the connector 165, and the keypad 166.

The speaker 163 may output sounds corresponding to various signals (e.g., radio signals, broadcast signals, digital audio files, digital video files or photography signals) from the mobile communication module 120, sub-communication module 130, multimedia module 140, or camera module 150 to the outside under control of the controller 110. The speaker 163 may output sounds (e.g., button-press sounds or ringback tones) that correspond to functions performed by the mobile device 100. There may be one or multiple speakers 163 arranged in a proper position or proper positions of the housing of the user terminal 100. The speaker 163 may output various sounds indicating various levels of remaining battery power in accordance with an embodiment of the present invention.

The vibration motor 164 may convert an electric signal to a mechanical vibration under control of the controller 110. For example, the user terminal 100 in a vibrating mode operates the vibrating motor 164 when receiving a voice call from another device (not shown). There may be one or more vibration motors 164 inside the housing of the user terminal 100. The vibration motor 164 may be driven in response to a touch activity or continuous touches of a user over the touch screen 190. The vibration motor 164 may output various vibration patterns indicating various levels of remaining battery power in accordance with an embodiment of the present invention.

The power supply 180 may supply power to one or more batteries placed inside the housing of the user terminal 100 under control of the controller 110. There may be one or more batteries. The battery 185 powers the user terminal 100. In an embodiment of the present invention, the battery 185 may be removably attached to the user terminal 100. The power supply 180 may supply the user terminal 100 with power input from the battery 185 or an external power source (not shown) via a cable connected to the connector 165.

The storage 185 may store signals or data input/output according to operations of the mobile communication module 120, the sub-communication module 130, the multimedia module 140, the camera module 150, the GPS module, the input/output module 160, the sensor module 170, the touch screen 190 under control of the controller 110. The storage 185 may store the control programs and applications for controlling the user terminal 100 or the controller 110.

The touchscreen 190 may provide the user with a user interface for various services (e.g., call, data transmission, broadcasting, photography services). The touchscreen 190 may send an analog signal corresponding to at least one touch input to the user interface to the touchscreen controller 195. The touch screen 190 may receive the at least one touch from user's physical contact (e.g., with fingers including the thumb) or via a touch input device (e.g., an electronic stylus pen). The touchscreen 190 may receive consecutive moves of one of the at least one touch. The touch screen 190 may send an analog signal corresponding to the consecutive moves of the input touch to the touchscreen controller 195. The touch screen 190 may be implemented in various ways, such as in a resistive, capacitive, infrared, Electronic Magnetic Resonance (EMR), or acoustic wave scheme, or a combination thereof.

Figure 3:
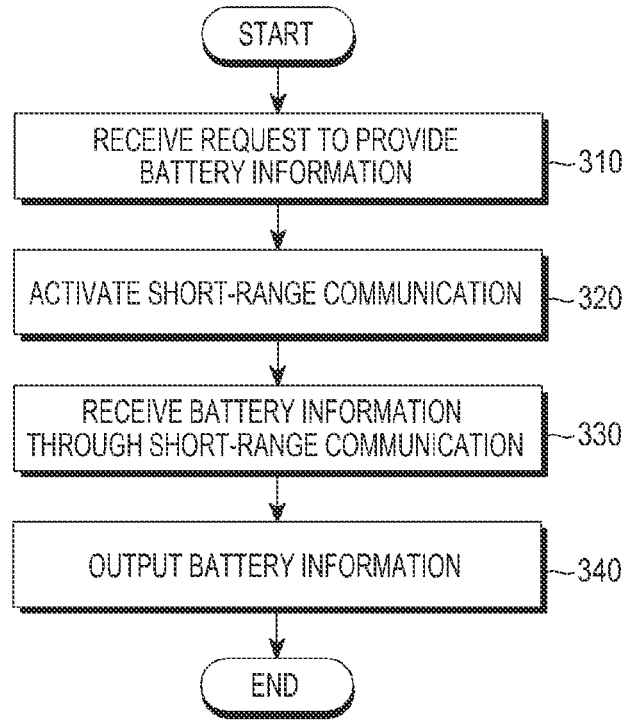
FIG. 3 is a flowchart illustrating a method for providing battery information in a user terminal, according to an embodiment of the present invention.

FIG. 3 is a flowchart illustrating a method for providing battery information with a user terminal, according to an embodiment of the present invention. Referring to FIG. 3, the user terminal 100 receives a request to provide battery information, in step 310. The request may be made when a user inputs the request or an application to provide battery information runs in the user terminal 100. The battery information may include information about battery voltage to indicate remaining battery power. The battery information may further include battery identification information to identify various batteries, e.g., whether the battery in question is an internal battery or an external battery, a main battery or an auxiliary battery, a high capacity battery or a low capacity battery, etc. The battery information may further include information about the usage of the battery, e.g., whether the battery is compatible with a particular type of terminal.

The user terminal 100 activates short-range communication in step 320 at the request to provide battery information. In an embodiment of the present invention, the short-range communication scheme is an NFC communication scheme, but may also be at least one of Bluetooth, RFID, Zigbee Communication schemes. In the following embodiments of the present invention, the use of NFC communication will be described. The user terminal 100 generates and outputs a predetermined NFC radio frequency (RF) for use as the NFC communication is activated. The predetermined NFC RF may be a predetermined frequency used to communicate with the battery information providing apparatus 200.

The user terminal 100 receives battery information from the battery information providing apparatus 200 through short-range communication in step 330. The battery information providing apparatus 200 receives the NFC wireless frequency output from the user terminal 100 as the user terminal 100 tags or approaches the battery information providing apparatus 200. Upon reception of the NFC wireless frequency from the user terminal 100, the battery information providing apparatus 200 checks the battery voltage and output battery information including the battery voltage information at the predetermined NFC RF. The user terminal 100 receives the battery information from the battery information providing apparatus 200 at the predetermined NFC RF.

The user terminal 100 outputs the battery information in step 340. For example, the user terminal 100 may display the battery voltage information on the touch screen 190, output an audio signal, or a vibration pattern for the battery voltage information.

The user terminal 100 displays the battery voltage information with at least one of battery identification information and battery usage information on the screen 190, through the speaker 163 as an audio signal, or by the vibration motor 164 as a vibration pattern.

By doing the above operations, the user easily checks information about the battery 185 through the user terminal 100, e.g., the touch screen 190, the speaker 163, or the vibration motor 164, or a combination thereof, by the NFC communication, or a different short-range communication scheme from the NFC communication scheme by tagging or approaching the user terminal 100 to a battery without attaching the battery to the user terminal 100.

The configuration and operations of the battery information providing apparatus 200 for providing battery information to the user terminal 100 will now be described.

Figure 4:
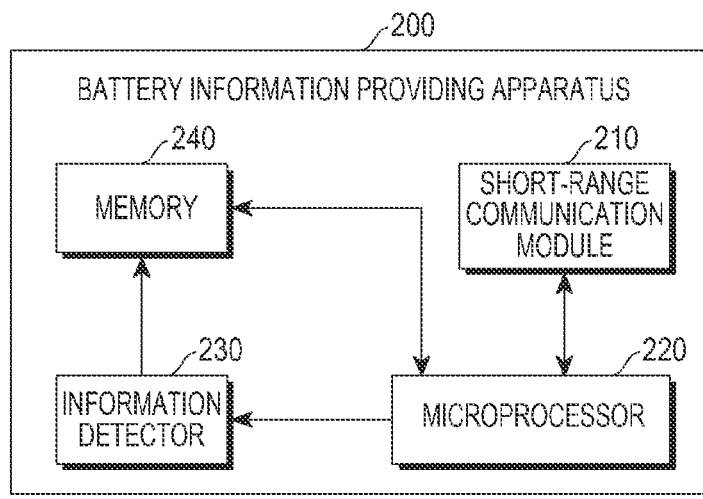
FIG. 4 is a block diagram of a battery information providing apparatus according to an embodiment of the present invention.

FIG. 4 is a block diagram of the battery information providing apparatus 200 according to an embodiment of the present invention. Referring to FIG. 4, the battery information providing apparatus 200 includes a short-range communication module 210, a microprocessor 220, an information detector 230, and a memory 240.

The short-range communication module 210 communicates with the user terminal 100 using short-range communication, such as Bluetooth, IrDA, WiFi-Direct, NFC, RFID, ZigBee, etc. In embodiments of the present invention, the user terminal 100 may perform NFC communication. For this, the short-range communication module 210 may include an NFC antenna (not shown). The short-range communication module 210 activates the NFC communication upon reception of an NFC RF from the user terminal 100.

The microprocessor 220 is turned on following the activation of the NFC communication. Once turned on, the microprocessor 220 controls the information detector 230 to detect a battery voltage. The information detector 230 may detect a voltage of the battery or other battery information, such as battery identification information, battery usage information, etc., which are stored in the memory 240. The microprocessor 220 also controls the battery voltage information to be stored in the memory 240. The microprocessor 220 also controls the battery voltage information to be sent to the user terminal 100 through the short-range communication module 210.

The information detector 230 detects a voltage of the battery 185 and stores battery voltage information about a voltage of the battery 185 in the memory 240. The memory 240 may further store battery identification information or battery usage information.

Figure 5:
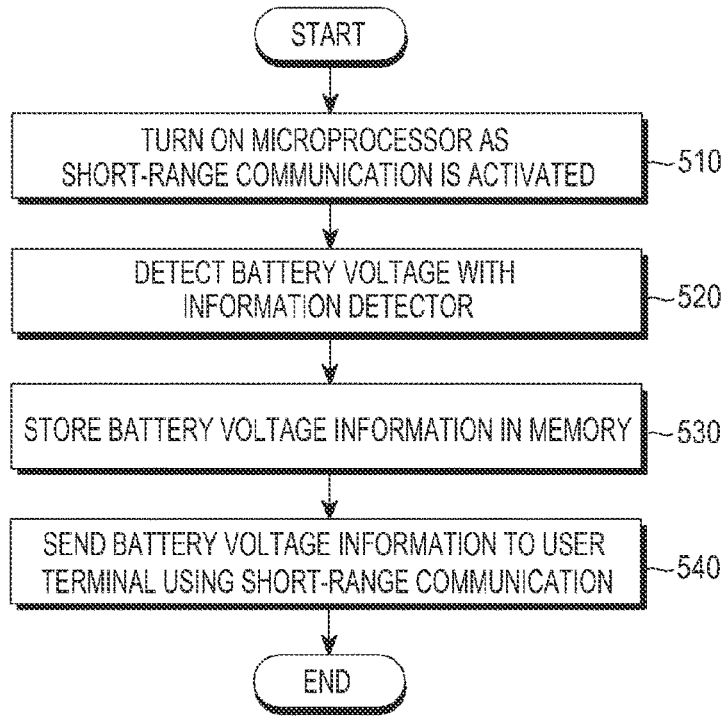
FIG. 5 is a flowchart illustrating operations of a battery information providing apparatus according to an embodiment of the present invention.

FIG. 5 is a flowchart illustrating operations of a battery information providing apparatus according to an embodiment of the present invention. Referring to FIG. 5, the battery information providing apparatus 200 turns on the microprocessor 220 as the NFC communication is activated, in step 510. As the user terminal 100 tags or approaches the battery information providing apparatus 200, the battery information providing apparatus 200 receives an NFC RF and, upon reception of the NFC RF, turns on the microprocessor 220.

The battery information providing apparatus 200 detects a voltage of a battery through the information detector 230, in step 520. Specifically, the information detector 230 detects a voltage of the battery 185 under control of the turned-on microprocessor 220. The battery information providing apparatus 200 stores the battery voltage information about the battery voltage in the memory 240, in step 530.

The battery information providing apparatus 200 may use the short-range wireless communication module 210 to send the battery information including the battery voltage information to the user terminal 100 wirelessly, in step 540. The battery information may further include battery identification information or battery usage information.

In an embodiment of the present invention, the battery information providing apparatus 200 is equipped in the battery or within a charging accessory to be used for charging the battery, so that the battery may communicate with the user terminal 100 when the battery is not connected to the user terminal.

Figure 6:
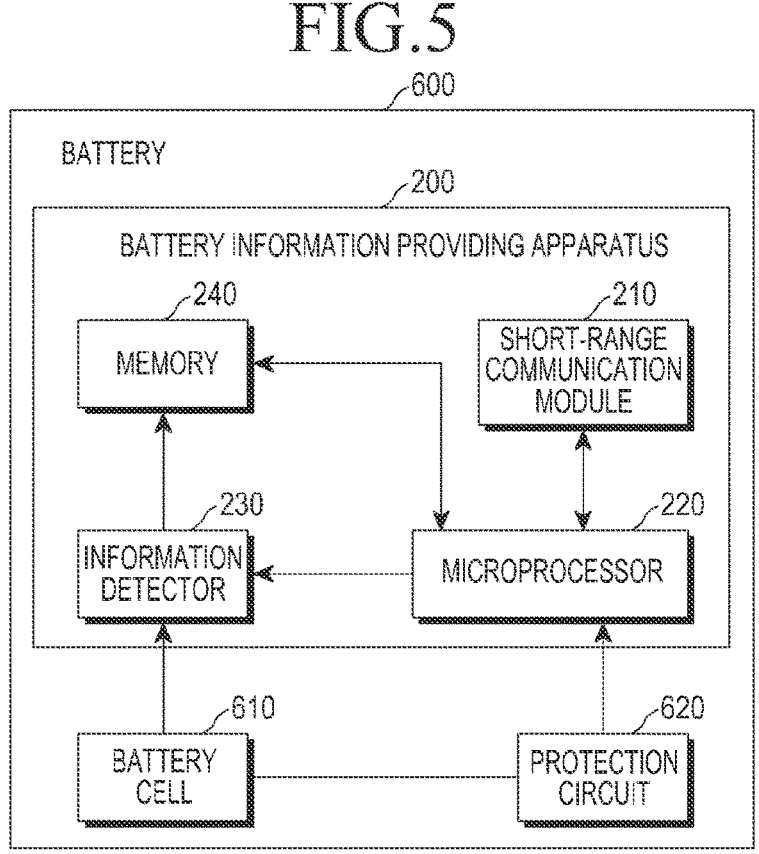
FIG. 6 is a block diagram of a battery information providing apparatus equipped in a battery according to an embodiment of the present invention.

FIG. 6 is a block diagram of a battery information providing apparatus equipped in a battery (or battery device) according to an embodiment of the present invention. Referring to FIG. 6, a battery 600 includes the battery information providing apparatus 200, at least one battery cell 610, and a protection circuit 620.

The battery 600 may be removably attached to the user terminal 100, and if attached, powers the user terminal 100 with accumulated power in battery cell 610.

Upon request of the user terminal 100 to provide battery information, the battery information providing apparatus 200 connects the information detector 230 with the battery cell 610 to detect a battery voltage of the battery cell 610, and stores battery voltage information about the battery voltage in the memory 240. The battery information providing apparatus 200 sends the battery information including the battery voltage information to the user terminal 100 wirelessly through the short-range communication module 210. The battery information providing apparatus 200 receives a signal to release connection between the battery cell 610 and the user terminal 100 from the protection circuit 620 while the battery cell 610 is connected to the information detector 230.

The protection circuit 620 detects whether the battery cell 610 is connected to the user terminal 100. Having detected that the battery cell 610 is connected to the user terminal 100, the protection circuit 620 provides the microprocessor 220 with a signal to release connection between the battery cell 610 and the information detector 230.

Figure 7:
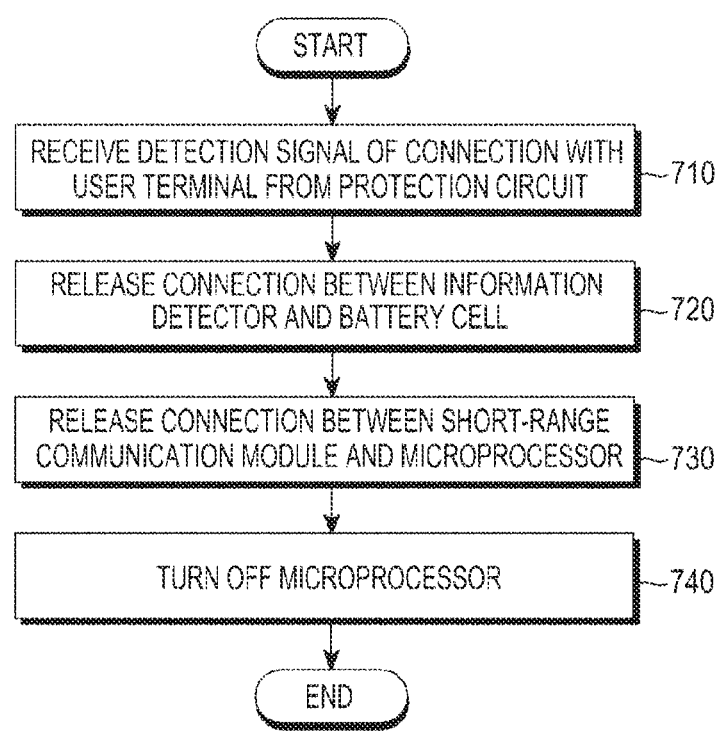
FIG. 7 is a flowchart illustrating operations of a battery information providing apparatus equipped in a battery according to an embodiment of the present invention.

FIG. 7 is a flowchart illustrating operations of a battery information providing apparatus equipped in a battery according to an embodiment of the present invention.

Referring to FIG. 7, the battery information providing apparatus 200 receives a detection signal indicating connection between the battery 600 and the user terminal 100 in step 710. The battery information providing apparatus 200 may receive the detection signal of connection between the battery 600 and the user terminal 100 from the protection circuit 620 as the battery cell 610 is connected to the user terminal 100.

The battery information providing apparatus 200 releases the connection between the information detector 230 and the battery cell 610 in step 720. The battery information providing apparatus 200 releases the connection between the short-range communication module 210 and the microprocessor 220, in step 730. The battery information providing apparatus 200 powers off the microprocessor 220 in step 740. In this regard, the microprocessor 220 may be programmed to be powered off.

As such, when the battery information providing apparatus 200 is equipped in the battery 600, if the user terminal 100 is connected to the battery 600, the battery information providing apparatus 200 may protect its circuits by disconnecting itself from the battery cell 610 and terminating operations of the battery information providing apparatus 200.

Figure 8:
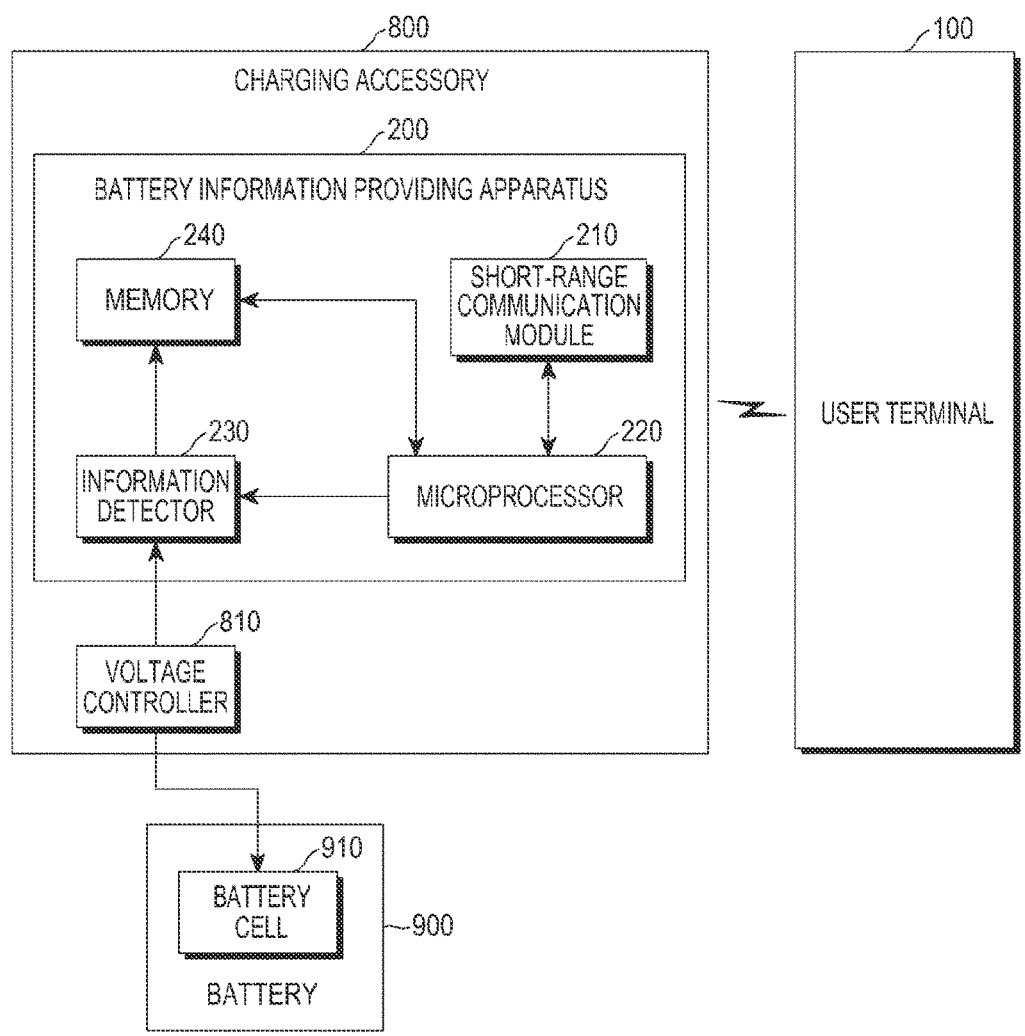
FIG. 8 shows a portable terminal and a block diagram of a battery information providing apparatus equipped in a charging accessory according to an embodiment of the present invention.

FIG. 8 shows a portable terminal and a block diagram of a battery information providing apparatus equipped in a charging accessory according to an embodiment of the present invention. Referring to FIG. 8, a charging accessory 800 is a device for charging a battery 900 with charging power.

The battery 900 is removably attached to the charging accessory 800 and charges the battery cell 910 with power provided by the charging accessory 800.

A voltage controller 810 controls the voltage from an external power source (not shown) to the battery cell 910 based on a voltage of the battery cell 910. Upon a request to provide battery information from the user terminal 100, the battery information providing apparatus 200 connects the information detector 230 with the voltage controller 810 to detect a battery voltage of the battery cell 910, and stores battery voltage information about the battery in the memory 240. The battery information providing apparatus 200 sends the battery information including the battery voltage information to the user terminal 100 through the short-range communication module 210 wirelessly.

Alternatively, according to an embodiment of the present invention, charging accessory 800 may notify the user terminal 100 of the status of the battery 900 upon the occurrence of certain charging levels. For example, the charging apparatus 800 may transmit a signal to the user terminal 100 when the battery 900 positioned on the charging apparatus 800 is fully charged, when the user terminal 100 is within range. In addition, the charging apparatus 800 may transmit a signal to the user terminal 100 when the charging amount is at certain levels, for example, 50% charged, 75% charged, etc., when the user terminal 100 is within range of the charging apparatus 800.

According to the embodiments of the present invention, a user may be informed of remaining battery power information of a battery using a short-range communication technology, such as Near Field Communication (NFC) tagging technology without attaching the battery to the user terminal, so that the user may know the remaining battery power information conveniently. In addition, the embodiments of the present invention that let the user know of the remaining battery power may be applicable to various devices by having the battery information providing apparatus 200 equipped inside the battery 600 (or 900), or in an external device, such as a charging accessory for battery charging.

As discussed below, methods according to embodiments of the present invention may be implemented in program instructions which are executable by various computing means and recorded in computer-readable media. The computer-readable media may include program instructions, data files, data structures, etc., separately or in combination. The program instructions recorded on the computer-readable media may be designed and configured specially for the present invention, or may be well-known to people having ordinary skill in the art of computer software.

It will be appreciated that the embodiments of the present invention may be implemented in a form of hardware, software, or a combination of hardware and software. The software may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The embodiments of the present invention may be implemented by a computer or portable terminal including a controller and a memory, and the memory may be an example of the computer readable recording medium suitable for storing a program or programs having instructions that implement the embodiments of the present invention.

The present invention may be implemented by a program having codes for embodying the apparatus and method described in claims, the program being stored in a machine (or computer) readable storage medium. The program may be electronically carried on any medium, such as communication signals transferred via wired or wireless connection, and the present invention suitably includes its equivalents.

The battery information providing apparatus may receive and store the program from a program provider connected thereto via cable or wirelessly. The program provider may include a memory for storing programs that include instructions to perform the method for providing battery information, a communication unit for performing wired or wireless communication with the battery information providing apparatus, and a controller for controlling the program to be transmitted through the communication unit automatically or upon request from the battery information providing apparatus.

Several embodiments have been described in connection with e.g., mobile communication terminals, but a person of ordinary skill in the art will understand and appreciate that various modifications can be made without departing the scope of the present invention. Thus, it will be apparent to those ordinary skilled in the art that the invention is not limited to the embodiments described, which have been provided only for illustrative purposes.

While the present invention has been particularly illustrated and described with reference to certain embodiments thereof, various modifications or changes can be made without departing from the scope of the present invention. Therefore, the scope of the present invention is not limited to the above-described embodiments, but should be defined by the scope of the following claims and any equivalents thereof.

What is claimed is:

1. A battery information providing apparatus comprising:
a short-range communication module for performing short-range communication;
an information detector for detecting battery information of a battery; and
a microprocessor for controlling the battery information to be transmitted by the short-range communication module, wherein the battery information comprises battery usage information indicating a type of terminals the battery is compatible with, wherein the battery information further comprises battery identification information, and wherein the battery identification information indicates whether the battery is an internal battery or an external battery, whether the battery is a main battery or an auxiliary battery, and whether the battery is a low-capacity battery or a high-capacity battery.

2. The apparatus of claim 1, wherein the battery information further comprises battery voltage information.

3. The apparatus of claim 1, wherein the short-range communication comprises at least one of Near Field Communication (NFC), Infrared Data Association (IrDA), Bluetooth, Radio Frequency Identification (RFID), and Zigbee communications.

4. The apparatus of claim 1, wherein the apparatus is equipped inside the battery or in a charging accessory that charges the battery.

5. The apparatus of claim 1, further comprising a memory for storing the battery information.

6. A method for informing a user of battery information, the method comprising:
receiving battery information of a battery through short-range communication; and
displaying the battery information,
wherein the battery information comprises battery usage information indicating a type of terminals the battery is compatible with, wherein the battery information further comprises battery identification information, and wherein the battery identification information indicates whether the battery is an internal battery or an external battery, whether the battery is a main battery or an auxiliary battery, and whether the battery is a low-capacity battery or a high-capacity battery.

7. The method of claim 6, wherein the short-range communication comprises at least one of Near Field Communication (NFC), Infrared Data Association (IrDA), Bluetooth, Radio Frequency Identification (RFID), and Zigbee communications.

8. The method of claim 6, wherein the battery information further comprises battery voltage information.

9. A user terminal comprising:
a short-range communication unit for receiving battery information of a battery through short-range communication; and
a display unit for displaying the battery information,
wherein the battery information comprises battery usage information indicating a type of terminals the battery is compatible with, wherein the battery information further comprises battery identification information, and wherein the battery identification information indicates whether the battery is an internal battery or an external battery, whether the battery is a main battery or an auxiliary battery, and whether the battery is a low-capacity battery or a high-capacity battery.

10. The user terminal of claim 9, wherein the short-range communication comprises at least one of Near Field Communication (NFC), Infrared Data Association (IrDA), Bluetooth, Radio Frequency Identification (RFID), and Zigbee communications.

11. The user terminal of claim 9, wherein the battery information further comprises battery voltage information.

12. A battery device comprising:
a battery cell; and
a battery information providing apparatus configured to store battery information of the battery device and transmit the battery information through a short-range communication module,
wherein the battery information comprises battery usage information indicating a type of terminals the battery device is compatible with, wherein the battery information further comprises battery identification information, and wherein the battery identification information indicates whether the battery is an internal battery or an external battery, whether the battery is a main battery or an auxiliary battery, and whether the battery is a low-capacity battery or a high-capacity battery.

13. The battery device of claim 12, wherein the battery information providing apparatus comprises:
an information detector connected to the battery cell for detecting a battery voltage of the battery cell;
a short-range communication module for performing short-range communication; and
a microprocessor for controlling the battery information to be transmitted by the short-range communication module.

14. The battery device of claim 13, further comprising a protection circuit for detecting whether the battery cell is connected to an external device and releasing connection between the battery cell and the information detector if the battery cell is connected to the external device.

15. The battery device of claim 12, wherein the battery information further comprises battery voltage information.

16. The battery device of claim 12, wherein the short-range communication comprises at least one of Near Field Communication (NFC), Infrared Data Association (IrDA), Bluetooth, Radio Frequency Identification (RFID), and Zigbee communications.

17. The battery device of claim 13, further comprising a memory for storing the battery information.

18. A battery charging apparatus comprising a battery information providing apparatus, the battery information providing apparatus including a short-range communication module for performing short-range communication, an information detector for detecting battery information of a battery and a microprocessor for controlling the battery information to be transmitted by the short-range communication module,
wherein the battery information comprises battery usage information indicating a type of terminals the battery is compatible with, wherein the battery information further comprises battery identification information, and wherein the battery identification information indicates whether the battery is an internal battery or an external battery, whether the battery is a main battery or an auxiliary battery, and whether the battery is a low-capacity battery or a high-capacity battery.

19. The battery charging apparatus of claim 18, wherein the short-range communication module transmits battery information to a user terminal upon occurrence of at least one charging level.

20. The battery charging apparatus of claim 19, wherein the at least one charging level includes a fully charged level of a battery being charged.

\* \* \* \* \*